US012639387B2

(12) United States Patent
Rapowitz et al.

(10) Patent No.: US 12,639,387 B2
(45) Date of Patent: May 26, 2026

(54) SYSTEMS AND METHODS FOR GENERATING DIRECTIONAL INFORMATION

(71) Applicant: Capital One Services, LLC, McLean, VA (US)

(72) Inventors: Samuel Rapowitz, Atlanta, GA (US); Tyler Maiman, Melville, NY (US); Armando Martinez Stone, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 281 days.

(21) Appl. No.: 18/585,239

(22) Filed: Feb. 23, 2024

(65) Prior Publication Data

US 2025/0272351 A1 Aug. 28, 2025

(51) Int. Cl.
*G06F 3/0484* (2022.01)
*G06F 16/954* (2019.01)

(52) U.S. Cl.
CPC .......... *G06F 16/954* (2019.01); *G06F 3/0484* (2013.01)

(58) Field of Classification Search
CPC . G06F 16/954; G06F 3/0484; G06Q 30/0627; G06Q 30/06; G06Q 30/0631
See application file for complete search history.

(56) References Cited

U.S. PATENT DOCUMENTS

| | | | |
|---|---|---|---|
| 10,387,436 B2 | 8/2019 | Tholiya et al. | |
| 10,709,980 B2 * | 7/2020 | Posin ...................... | A63F 13/35 |
| 2018/0268049 A1 | 9/2018 | Youssefian | |
| 2019/0325498 A1 | 10/2019 | Clark | |
| 2020/0302510 A1 | 9/2020 | Chachek et al. | |
| 2023/0289868 A1 * | 9/2023 | Bender .................. | G06N 5/022 |
| 2023/0342833 A1 * | 10/2023 | Wang ................... | G06N 3/0499 |
| 2025/0200634 A1 * | 6/2025 | Zhang ................ | G06Q 30/0631 |

* cited by examiner

*Primary Examiner* — Rinna Yi
(74) *Attorney, Agent, or Firm* — Bookoff McAndrews, PLLC

(57) ABSTRACT

Systems and methods for generating directional information, including detecting an occurrence of a first trigger event, upon detecting the occurrence of the first trigger event, generating a first search query based on a predicted object, determining a target object based on the first search query, determining a recommended navigation path to the target object, generating a first graphical user interface (GUI) based on the recommended navigation path, and causing to display the first GUI.

18 Claims, 6 Drawing Sheets

300

400

SYSTEMS AND METHODS FOR GENERATING DIRECTIONAL INFORMATION

TECHNICAL FIELD

Various embodiments of this disclosure relate generally to providing directional information and, more particularly, to systems and methods for generating a first graphical user interface (GUI) based on a recommended navigation path.

BACKGROUND

Conventional methods of website navigation often involve a user sorting through extensive resources, even with the use of search boxes. The enormous amount of information and options may not only overwhelm a potential buyer, but operating systems, browsers, etc. For example, a user may desire to purchase an item from a website, but navigating the website may induce a significant amount of confusion and require an amount of compute that may chill the potential buyer's interest in continuing shopping and/or ability to complete the sale.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for providing directional information.

In one aspect, a method for generating directional information is disclosed. The method may include: detecting an occurrence of a first trigger event; upon detecting the occurrence of the first trigger event, generating, via one or more processors, a first search query based on a predicted object; determining, via a first trained machine learning model, a target object based on the first search query; determining, via the first trained machine learning model, a recommended navigation path to the target object based on at least one of website data, historical user data, or user preference data; generating a first graphical user interface (GUI) based on the recommended navigation path, the first GUI including an overlay over a first aspect of a website; and causing to output, via a user interface, the first GUI.

In another aspect, a system is disclosed. The system may include: at least one memory storing instructions; and at least one processor operatively connected to the at least one memory, and configured to execute the instructions to perform operations for generating directional information. The operations may include: detecting an occurrence of a first trigger event; upon detecting the occurrence of the first trigger event, generating, via one or more processors, a first search query based on a predicted object; determining, via a first trained machine learning model, a target object based on the first search query; determining, via the first trained machine learning model, a recommended navigation path to the target object based on at least one of website data, historical user data, or user preference data; generating a first graphical user interface (GUI) based on the recommended navigation path, the first GUI including an overlay over a first aspect of a website; and causing to output, via a user interface, the first GUI.

In a further aspect, a method for generating directional information is disclosed. The method may include: detecting an occurrence of a first trigger event, the first trigger event including one or more of opening a website, selecting a link on the website, or entering a search on the website; upon detecting the occurrence of the first trigger event, generating, via one or more processors, a first search query based on a predicted object, wherein the predicted object is determined via one of: (i) obtaining, via a user interface, a request for the predicted object, the request associated with a user, or (ii) determining, via a trained object prediction machine learning model, the predicted object based on at least one of website data, historical user data, or user preference data; determining, via a trained target object machine learning model, a target object based on the first search query; determining, via the trained target object machine learning model, a recommended navigation path to the target object based on at least one of website data, historical user data, or user preference data; generating a first GUI based on the recommended navigation path, the first GUI including an overlay over a first aspect of the website; and causing to output, via the user interface, the first GUI.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
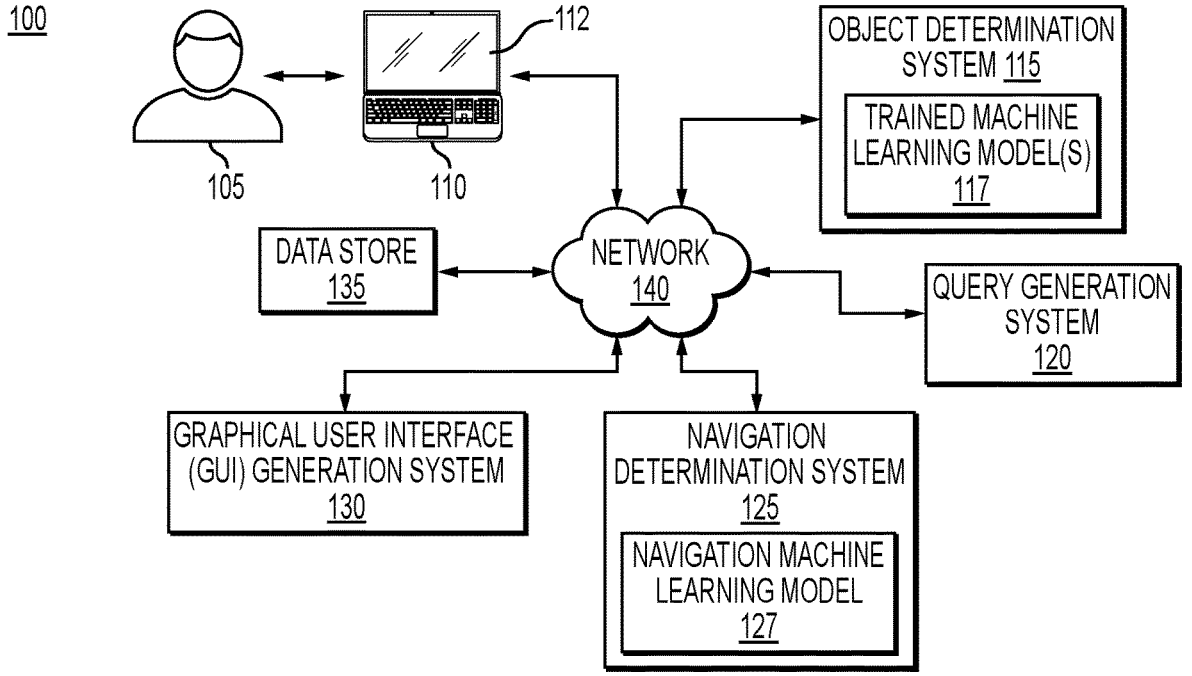
FIG. 1 depicts an exemplary environment for generating directional information, according to one or more embodiments.

Reference to any particular activity is provided in this disclosure only for convenience and not intended to limit the disclosure. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially," "approximately," and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, the terms "direction," "directional," "navigation," or "navigational" may generally encompass guidance for the action of moving around or interacting with a website, the internet, etc.

As used herein, a "machine learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine learning model may operate on an input linearly, in parallel, via a network (e.g., a neural network), or via any suitable configuration.

The execution of the machine learning model may include deployment of one or more machine learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc.

In an exemplary use case, a browser plug-in may be utilized to generate directional information for navigating a user through various interactions available at a website. The user may interact with a website (e.g., via a browser) via a graphical user interface (GUI) of a user device, e.g., a laptop. The occurrence of one or more trigger events may be detected, which may activate a system hosting a directional information generation system. The directional information generation system may be in the form of a native browser functionality, a browser plug-in, an application programming interface (API), etc. Upon activation, the activated system hosting the directional information generation system may determine a predicted object (e.g., one or more products or categories of products that the user may be shopping for, may desire, etc.). For example, upon the user navigating to a grocery website, the browser plug-in may determine (e.g., based on the user's purchasing habits) the user is due to purchase milk and/or that the user may desire to purchase milk. In some techniques, the predicted object may be determined by a trained machine learning model based on one or more of website data, historical user data, and/or user preference data.

The browser plug-in may generate a first search query based on the predicted object. The first search query may be based on the inventory of the visited website, e.g., one or more types of milk, other dairy products, other grocery products, etc. Based on the first search query, a target object may be determined. For example, Brand A of milk may be determined as the target object.

A recommended navigation path to the target product (e.g., a virtual path navigating the user through the website) may be generated based on the target object and at least one of the website data, the historical user data, or the user preference data. For example, if the user is at the homepage of the grocery website and the target product is Brand A milk, a navigation path through the website from the homepage to the Brand A item page may be generated. A GUI may be generated based on the recommended navigation path and/or caused to be output, e.g., via a user interface of the user device. For example, to indicate to the user where to click a mouse pointer, an overlay may be used. In some techniques, the overlay may include a heat map, a hot spot, an indicator, etc.

By implementing a GUI displaying a recommended navigation path, the user may interact with a greater number of objects than if the user had navigated directly to the object, e.g., via the search box. As such, resources that may otherwise have been spent generating user- and object-specific advertisements, product recommendations, etc. may be used elsewhere.

While the examples above involve generating directional information for shopping, it should be understood that techniques according to this disclosure may be adapted to any suitable method, e.g., shopping for various items, navigating a user through pages of websites, etc. It should also be understood that the examples above are illustrative only. The techniques and technologies of this disclosure may be adapted to any suitable activity. Presented below are various systems and methods of generating directional information.

FIG. 1 depicts an exemplary environment for generating directional information, according to one or more embodiments. Environment 100 of FIG. 1 depicts a user 105 and a user device 110, which may interact, e.g., over a network 140, with at least one server system hosting a directional information generation system. The directional information generation system may include an object determination system (hereinafter "object system") 115, a query generation system (hereinafter "query system") 120, a navigation determination system (hereinafter "navigation system") 125, a graphical user interface (GUI) generation system (hereinafter "GUI system") 130, and a data store 135, etc.

User device 110 may be configured to obtain at least one input (e.g., via a graphical user interface (GUI) associated with user device 110 (hereinafter "GUI") 112). For example, user device 110 may be configured to receive at least one input from user 105 via GUI 112. User device 110 may be further configured to communicate with (e.g., receive data, transmit data, etc.) other aspects of environment 100, e.g., query system 120, object system 115, navigation system 125, GUI system 130, etc. via network 140. For example, user device 110 may be configured to obtain a GUI generated by GUI system 130. The user device 110 may be a computer system such as, for example, a desktop computer, a mobile device, etc. In an exemplary embodiment, the user device 110 may be a cellphone, a tablet, or the like. In some embodiments, the user device 110 may include one or more electronic application(s), e.g., a program, plugin, browser extension, etc., installed on a memory of the user device 110. In some embodiments, the electronic application(s) may be associated with one or more of the other components in the environment 100. For example, the electronic application(s) may include a web browser, another application, or the like configured to allow access to products or services offered by an entity associated with a third party. In some embodiments, the electronic applications may include online shopping software associated with a merchant and/or a web browser configured to access such online shopping software.

Object system 115 may be configured to determine a predicted object and/or a target object. The predicted object may be one or more products or categories of products that user 105 may be shopping for, may desire, may need, etc. The target object may be a specific object that user 105 may be shopping for, may desire, may need, etc. For example, the predicted object may be baby formula and the target object may be Brand X baby formula. In some embodiments, object system 115 may be configured to determine a predicted object and/or a target object using at least one trained machine learning model 117, e.g., a trained predicted object machine learning model, a trained target object machine learning model, a trained user preference machine learning model, etc.

Object system 115 may be configured to determine a predicted object, e.g., in response to detection of at least one trigger event. Object system 115 may be configured to detect at least one trigger event by monitoring inputs from user 105, e.g., via GUI 112. The at least one trigger event may include at least one of user 105 (e.g., via GUI 112) opening a website, selecting a link on the website, entering a search on the website, holding a cursor over an image or virtual object, etc. In some embodiments, the trigger event may be user 105 manually activating object system 115. For example, user 105 may navigate to a website and select a browser plug-in icon associated with the system hosting the directional information generation system, thereby activating object system 115.

Upon detecting the trigger event, object system 115 may be configured to determine the predicted object. Object system 115 may determine, predict, etc. the predicted object based on one or more of website data, historical user data, and/or user preference data.

Website data may include site-specific data and/or metadata associated with a website, e.g., the name of the website used by user 105, the contents of the website (e.g., the inventory, stock keeping unit numbers, merchant name(s) and/or merchant category codes, etc.), the categories of items sold by the website, the website structure (e.g., hierarchical, sequential, matrix, or database model), user profile on the website, user browsing history, etc. Website date may be associated with one or both of active browser and/or site data or historical browser and/or site data.

Historical user data may include data and/or metadata associated with historical user interactions (e.g., online or in-store transaction), historical user returns, prior searches associated with the website (e.g., prior searches conducted by user 105), previously viewed object reviews (e.g., object reviews previously viewed by user 105), or purchase history data (e.g., user 105 purchase history data), etc. Historical user data may be obtained via cookies, data related to third-party user account(s) (e.g., banking account transaction data and/or metadata), etc. User 105 may provide advance permission and/or authorization for object system 115 to access historical data.

User preference data may include one or more user-specific preferences associated with an object, e.g., size, color, composition, style, brand, etc. For example, user preference data may include that user 105 prefers Brand A milk to Brand B milk. In a further example, user preference data may include that user 105 used to prefer Brand 1 coffee, and now prefers Brand 2 coffee.

User preference data may be input, determined, stored, etc. via a user profile. The user profile may be established by user 105, e.g., input via GUI 112 during initialization of the browser plug-in, the API, etc. Object system 115 may be configured to generate the user profile based on data obtained from user 105 (e.g., via GUI 112), third-party systems (e.g., systems storing transaction history, etc.), other aspects of environment 100, etc. The user profile may contain user-specific information, such as user brand preferences, prior purchases on the website, prior purchases on related websites, prior purchases (e.g., online or in-store) of the same or similar objects across at least one website), etc. The user profile may be generated during an initialization phase, e.g., when user 105 downloads, activates, etc. the system hosting the directional information system. The user profile may be modified by user 105, by object system 115, etc. In some embodiments, user 105 may update the user profile if brand preference for an object changes.

In some embodiments, object system 115 may be configured to update the user profile based on purchases, etc. For example, object system 115 may determine that, while user 105 used to prefer Brand 1 coffee, user 105 now prefers Brand 2 coffee based on recent purchase history. Prior and current user preference data may be stored for later use. For example, as discussed in further detail below, if user 105 currently prefers Brand 2 coffee but used to prefer Brand 1 coffee, and the website only sells Brand 1 coffee and Brand 3 coffee, object system 115 may determine that user 105 may prefer Brand 1 coffee over Brand 3 coffee based on the user preference data.

User preference data may be determined from historical user data, such features associated with the object (e.g., style, color, cut, etc.), a date of purchase, objects returned to the merchant, purchase price of the object, etc. In some techniques, user preference data may be determined via a trained machine learning model, e.g., a trained user preference machine learning model. As discussed in further detail below, object system 115 may one or more of generate, store, train, and/or use a machine learning model configured to determine the user preference, e.g., trained user preference machine learning model. Object system 115 may include a machine learning model and/or instructions associated with the machine learning model, e.g., instructions for generating a machine learning model, training the machine learning model, using the machine learning model, etc. Object system 115 may include instructions for retrieving website data, historical user data, user preference data, e.g., based on the output of the machine learning model. Object system 115 may include training data (e.g., training website data, training historical user data, training user preference data, training outcome data (e.g., object purchase made by user 105), etc.), and may include ground truth, e.g., known user preferences. User preference machine learning model may be trained to determine a user preference based on prior purchases by user 105. For example, if user 105 typically buys Brand 1 coffee over other brands, trained user preference machine learning model may predict user 105 prefers Brand 1 coffee.

In some embodiments, a system or device other than object system 115 is used to generate and/or train the machine learning model. For example, such a system may include instructions for generating the machine learning model, the training data and ground truth, and/or instructions for training the machine learning model. A resulting trained machine learning model may then be provided to user preference machine learning model, e.g., at object system 115.

Generally, a machine learning model includes a set of variables, e.g., nodes, neurons, filters, etc., that are tuned, e.g., weighted or biased, to different values via the application of training data. In supervised learning, e.g., where a ground truth is known for the training data provided, training may proceed by feeding a sample of training data into a model with variables set at initialized values, e.g., at random, based on Gaussian noise, a pre-trained model, or the like. The output may be compared with the ground truth to determine an error, which may then be back-propagated through the model to adjust the values of the variable.

Training may be conducted in any suitable manner, e.g., in batches, and may include any suitable training methodology, e.g., stochastic or non-stochastic gradient descent, gradient boosting, random forest, etc. In some embodiments, a portion of the training data may be withheld during training and/or used to validate the trained machine learning model, e.g., compare the output of the trained model with the ground truth for that portion of the training data to evaluate an accuracy of the trained model. The training of the machine learning model may be configured to cause the machine learning model to learn associations between the training data and the ground truth data, such that the trained machine learning model is configured to determine and/or output a user preference in response to a user input based on the learned associations.

In various embodiments, the variables of a machine learning model may be interrelated in any suitable arrangement in order to generate the output. For example, the machine learning model may include one or more convolutional neural network (CNN) configured to identify features in the user preference data, and may include further architecture, e.g., a connected layer, neural network, etc., configured to determine a relationship between the identified features in order to determine one or more user preferences.

In some instances, different samples of training data and/or input data may not be independent. Thus, in some embodiments, the machine learning model may be configured to account for and/or determine relationships between multiple samples. For example, in some embodiments, trained user preference machine learning model may include a Recurrent Neural Network (RNN). Generally, RNNs are a class of feed-forward neural networks that may be well adapted to processing a sequence of inputs. In some embodiments, the machine learning model may include a Long Short Term Memory (LSTM) model and/or Sequence to Sequence (Seq2Seq) model.

Based on at least one of website data, historical user data, and/or user preference data, object system 115 may determine, predict, etc. the predicted object. In some embodiments, object system 115 may determine the predicted object via a trained machine learning model. Object system 115 may one or more of generate, store, train, and/or use a machine learning model configured to determine the predicted object, e.g., trained predicted object machine learning model. Object system 115 may include a machine learning model and/or instructions associated with the machine learning model, e.g., instructions for generating a machine learning model, training the machine learning model, using the machine learning model, etc. Object system 115 may include instructions for retrieving website data, historical user data, user preference data, e.g., based on the output of the machine learning model. Object system 115 may include training data (e.g., training website data, training historical user data, training user preference data, training outcome data (e.g., object purchase made by user 105), etc.), and may include ground truth, e.g., predicted object data. Predicted object machine learning model may be trained to determine a predicted object based on a prediction that user 105 may need or desire an object based on at least historical user data. For example, if user 105 buys baby formula once every week, predicted object machine learning model may be configured to predict that user 105 may purchase baby formula once every subsequent week.

In some embodiments, a system or device other than predicted object machine learning model is used to generate and/or train the machine learning model. For example, such a system may include instructions for generating the machine learning model, the training data and ground truth, and/or instructions for training the machine learning model. A resulting trained machine learning model may then be provided to predicted object machine learning model. Training may be conducted using any suitable means, as discussed herein.

Object system 115 may be configured to determine a target object. In some embodiments, object system 115 may be configured to determine the target object based on at least one search query (e.g., a first search query, a second search query, etc.). The at least one search query may be generated as discussed in further detail below.

Based on the search query and/or website data, historical user data, and/or user preference data, object system 115 may determine, predict, etc. the target object. In some embodiments, object system 115 may determine the target object via a trained machine learning model. Object system 115 may one or more of generate, store, train, and/or use a machine learning model configured to determine the target object, e.g., trained target object machine learning model. Object system 115 may include a machine learning model and/or instructions associated with the machine learning model, e.g., instructions for generating a machine learning model, training the machine learning model, using the machine learning model, etc. Object system 115 may include instructions for retrieving the at least one search query, website data, historical user data, user preference data, e.g., based on the output of the machine learning model. Object system 115 may include training data (e.g., training search query data, training website data, training historical user data, training user preference data, training outcome data (e.g., object purchase made by user 105), etc.), and may include ground truth, e.g., target object data. Target object machine learning model may be trained to determine a target object based on a prediction that, given user 105 may need or desire an object in a certain category, user 105 may desire the target object based on at least historical user data. For example, if object system 115 determines that user 105 may desire, require, etc. baby formula, target object machine learning model may be configured to predict that user 105 may purchase Brand 1 baby formula.

In some embodiments, a system or device other than target object machine learning model is used to generate and/or train the machine learning model. For example, such a system may include instructions for generating the machine learning model, the training data and ground truth, and/or instructions for training the machine learning model. A resulting trained machine learning model may then be provided to target object machine learning model. Training may be conducted using any suitable means, as discussed herein.

Query system 120 may be configured to generate at least one search query (e.g., a first search query, a second search query, etc.). Query system 120 may generate the at least one search query based on data obtained from any suitable aspect of environment 100, e.g., user device 110, object system 115, navigation system 125, GUI system 130, and/or data store 135. Query system 120 may generate one or more search queries based on data including at least one of website data, historical user data, user preference data, the predicted object, etc. For example, query system 120 may be configured to generate a search query based on website data and/or the predicted object. Query system 120 may be configured to output the one or more search queries to any suitable aspect of environment 100, e.g., user device 110, object system 115, navigation system 125, GUI system 130, data store 135, etc.

Query system 120 may be configured to generate one or more search queries based on one or more determined weights, e.g., relative weights of the one or more user preferences. In some embodiments, weights for each user preference may be determined. For example, a user may prefer organic and local food, but the food locality may have a greater weight than that the food is organic. Any suitable method for setting and/or determining weights may be used.

Navigation system 125 may be configured to determine at least one navigation path (e.g., a first navigation path, a second navigation path, etc.). A navigation path may be a path within a webpage and/or through a website to navigate user 105 from a first webpage of the website to a webpage that may include the target object. The at least one navigation path may navigate user 105 to and/or through any suitable number of webpages, e.g., to a second webpage, a third webpage, a fourth webpage, etc. For example, the at least one navigation path may navigate user 105 within a single webpage. In another example, the at least one navigation path may navigate user 105 may navigate user 105 to multiple webpages. The at least one navigation path may be determined based on one or more of the predicted object, the target object, website data, historical user data, user preference data, etc.

Navigation system 125 may be configured to determine at least one navigation path for navigating user 105 through at least one webpage with products that may be relevant to user

105. For example, if a navigation path is navigating to a Brand A diapers at the target object, the navigation path may include webpages with baby-related objects (e.g., bottles, clothes, strollers, etc.). Navigation system 125 may be configured to determine at least one navigation path based on at least one of the target object, the search query, the predicted object, website data, historical user data, user preference data, user interaction data, etc. In some embodiments, multiple navigation paths may be determined. For example, a first navigation path may be determined based on at least one of the target object, the search query, the predicted object, website data, historical user data, user preference data, and a second navigation path may be determined based on user interaction data and at least one of the target object, the search query, the predicted object, website data, historical user data, or user preference data.

In some embodiments, navigation system 125 may determine the navigation path via a trained machine learning model. Navigation system 125 may one or more of generate, store, train, and/or use a machine learning model configured to determine the navigation path, e.g., a navigation machine learning model 127. Navigation system 125 may include a machine learning model (e.g., navigation machine learning model 127) and/or instructions associated with the machine learning model, e.g., instructions for generating a machine learning model, training the machine learning model, using the machine learning model, etc. Navigation system 125 may include instructions for retrieving the target object, the predicted object, the at least one search query, website data, historical user data, or user preference data, e.g., based on the output of the machine learning model. Navigation system 125 may include training data (e.g., training search query data, training website data, training historical user data, training target object data, training predicted object data, training search query data, training user preference data, training outcome data (e.g., object purchase made by user 105), etc.), and may include ground truth, e.g., navigation path data. Navigation machine learning model 127 may be trained to determine a navigation path based on the target object, website data, historical user data, and/or user preference data. For example, if the target object is Brand A coffee, navigation machine learning model 127 may determine a navigation path that navigates through related webpages, such as webpages associated with coffee accessories (e.g., filters, measuring spoons, espresso tampers, etc.), coffee-related sales or deals, etc.

In some embodiments, a system or device other than navigation system 125 is used to generate and/or train navigation machine learning model 127. For example, such a system may include instructions for generating the machine learning model, the training data and ground truth, and/or instructions for training the machine learning model. A resulting trained machine learning model may then be provided to navigation machine learning model 127. Training may be conducted using any suitable means, as discussed herein.

GUI system 130 may be configured to generate at least one GUI, e.g., a navigation GUI. The navigation GUI may be a GUI that navigates user 105 within a webpage and/or within multiple webpages. In some embodiments, the navigation GUI may be an overlay and may include at least one of a heat map, a hot spot, an indicator, etc. An exemplary navigation GUI is discussed in more detail below.

GUI system 130 may obtain data from one or more aspects of environment 100, e.g., from user device 110, object system 115, query system 120, navigation system 125, data store 135, etc. GUI system 130 may transmit data to one or more aspects of environment 100, e.g., to user device 110, object system 115, query system 120, navigation system 125, data store 135, etc. GUI system 130 may cause to output the navigation GUI via a browser plug-in, an application programming interface (API), etc., e.g., via GUI 112.

In some embodiments, GUI system 130 may be configured to obtain user interaction data, e.g., via GUI 112. User interaction data may be how user 105 interacts with GUI 112 (e.g., a first GUI), such as by clicking, cursor hovering, etc. In response to user interaction data, GUI system 130 may be configured to generate a second GUI. The second GUI may include a second (e.g., alternative) recommended navigation path (as described above). For example, if a first GUI includes a heat map of a first recommended navigation path and user 105 does not interact with the first recommended navigation path, GUI system 130 may be configured to generate a second GUI, which may include a second recommended navigation path.

Data store 135 may be configured to store data obtained from at least one aspect of environment 100, e.g., user device 110, query system 120, object system 115, navigation system 125, GUI system 130, etc. Data store 135 may be configured to transmit data to at least one aspect of environment 100, e.g., user device 110, query system 120, object system 115, navigation system 125, GUI system 130, etc. The data stored and/or transmitted by network 140 may include any data described herein, such as website data, historical user data, user preference data, predicted objects, target objects, search queries, navigation paths, GUIs (e.g., GUIs generated by GUI system 130, such as the navigation GUI), etc.

One or more of the components in FIG. 1 may communicate with each other and/or other systems, e.g., across network 140. In some embodiments, network 140 may connect one or more components of environment 100 via a wired connection, e.g., a USB connection between user device 110 and data store 135. In some embodiments, network 140 may connect one or more aspects of environment 100 via an electronic network connection, for example a wide area network (WAN), a local area network (LAN), personal area network (PAN), or the like. In some embodiments, the electronic network connection includes the internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network may obtain information from any other computer and communicate with parties of other computers or devices. The most widely used part of the Internet is the World Wide Web (often-abbreviated "WWW" or called "the Web"). A "website page," a "portal," or the like generally encompasses a location, data store, or the like that is, for example, hosted and/or operated by a computer system so as to be accessible online, and that may include data configured to cause a program such as a web browser to perform operations such as send, receive, or process data, generate a visual display and/or an interactive interface, or the like. In any case, the connections within the environment 100 may be network, wired, any other suitable connection, or any combination thereof.

Although depicted as separate components in FIG. 1, it should be understood that a component or portion of a component in the environment 100 may, in some embodiments, be integrated with or incorporated into one or more other components. For example, navigation system 125 may be integrated in object system 115. In another example, object system 115 may further include query system 120. In some embodiments, operations or aspects of one or more of the components discussed above may be distributed amongst one or more other components. Any suitable arrangement and/or integration of the various systems and devices of the environment 100 may be used.

Figure 2:
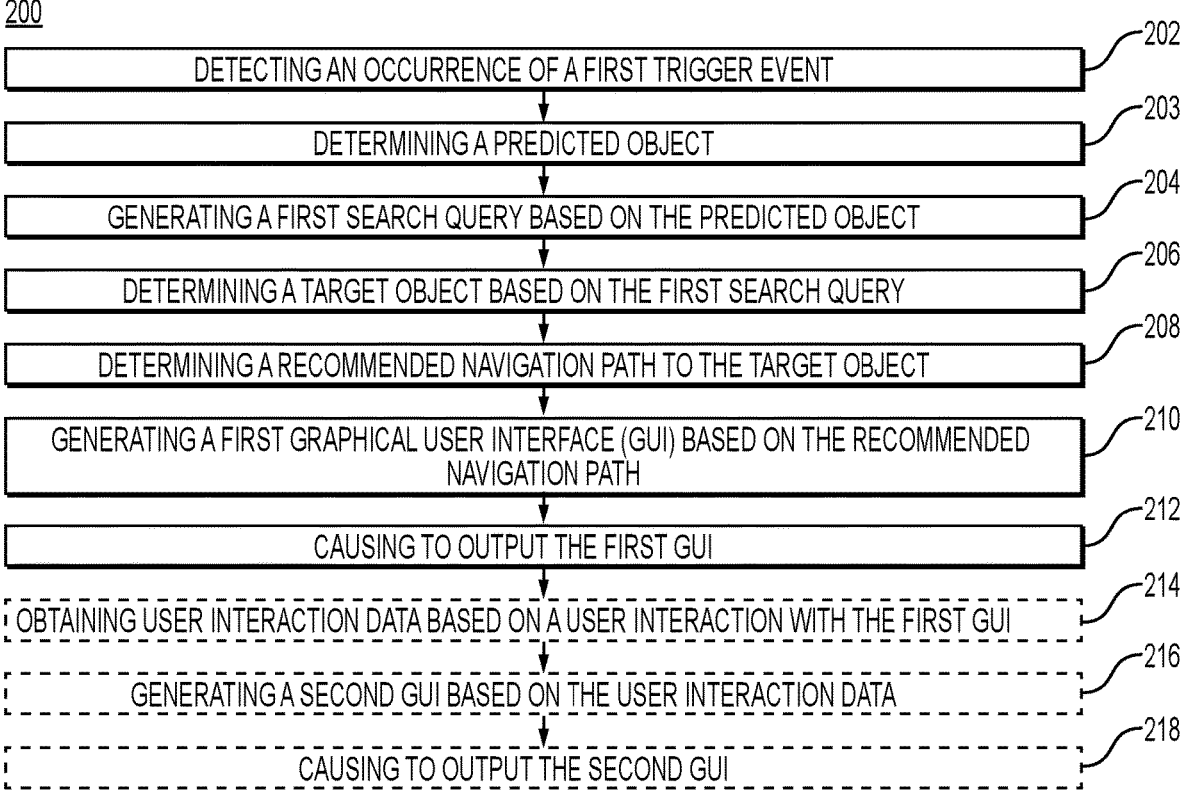
FIG. 2 depicts an exemplary method for generating directional information, according to one or more embodiments.

FIG. 2 depicts a method 200 for generating directional information, according to one or more embodiments. At step 202, an occurrence of a trigger event (e.g., a first trigger event) may be detected (e.g., by object system 115). As discussed above, the trigger event may include one or more of opening a website, selecting a link on the website, entering a search on the website, holding a cursor over an image or virtual object, etc. For example, the first trigger event may be user 105 navigating to a website. In response to detecting the occurrence of the trigger event, a request for a predicted object may be generated and/or obtained by object system 115. The request may be associated with a user (e.g., user 105).

At step 203, a predicted object may be determined. The predicted object may be determined based on website data, historical user data, and/or user preference data (e.g., from the user profile). In some embodiments, the predicted object may be determined using a trained machine learning model, e.g., predicted object machine learning model. The trained predicted object machine learning model may be trained to infer the predicted object based on one or more of website data, historical user data, and/or user preference data. For example, the trained predicted object machine learning model may be trained to predict that user 105 may require baby diapers, given user 105 has purchased baby diapers every week for the last 6 months and user 105 has not purchased baby diapers in over 7 days. In another example, the trained predicted object machine learning model may be trained to predict that user 105 may desire to purchase coffee on a website that sells coffee and coffee accessories, given that user 105 has historically purchased coffee from the website but not coffee accessories. As discussed herein, any suitable machine learning techniques may be used, e.g., transformer, K-means clustering, etc.

At step 204, a search query (e.g., a first search query) may be generated. The search query may be generated based on the predicted object (determined at step 202) and/or at least one of website data, historical user data, user preference data, etc. For example, the first search query may be based on the predicted object and the website inventory.

The search query may be generated via indexing, tokenizing, or another suitable method, etc. For example, an available website inventory may be determined based on the predicted object and/or historical user data (e.g., prior purchases the same or similar to the predicted object). The available website inventory may be indexed in a database by object feature (e.g., object category, object description, etc.) and the search query may be a query for the database. In another example, the database may be tokenized such that each object feature is converted to a token, and querying is conducted by searching by a token value, e.g., a serial number corresponding to the object feature. The search query may be executed to identify a target object, as described in further detail below (see step 206).

At step 206, a target object may be determined. The target object may be determined based on the first search query and/or website data, historical user data, and/or user preference data. In some embodiments, the target object may be determined using a trained machine learning model, e.g., target object machine learning model. The trained target object machine learning model may be trained to infer the target object based on the search query and/or one or more of website data, historical user data, and/or user preference data. For example, the trained target object machine learning model may be trained to predict that, given user 105 may require baby diapers, user 105 may desire Brand A baby diapers. As discussed herein, any suitable machine learning techniques may be used, e.g., transformer, K-means clustering, etc.

At step 208, at least one navigation path (e.g., a recommended navigation path) to the target object may be determined. The recommended navigation path may be determined based on one or more of the predicted object, the target object, the first search query, website data, historical user data, and/or user preference data. As described in more detail above, the at least one navigation path may navigate user 105 to the target object through webpages with target object-related objects. In some embodiments, the recommended navigation path may be determined using a trained machine learning model, e.g., navigation path machine learning model. The trained navigation path machine learning model may be trained to infer the navigation path based on one or more of the predicted object, the target object, the first search query, website data, historical user data, and/or user preference data.

For example, given the target object is Brand A baby diapers, navigation path machine learning model may be trained to predict a path to Brand A baby diapers through the website that navigates user 105 near other items user 105 may require, e.g., baby clothes, baby formula, etc. In another example, given the target object is Brand A baby diapers, navigation path machine learning model may be trained to predict a path to Brand A baby diapers through the website that navigates user 105 near relevant sales, deals, specials, etc. that the website may include. As discussed herein, any suitable machine learning techniques may be used, e.g., transformer, K-means clustering, etc.

At step 210, the system hosting the directional information generation system may generate a GUI (e.g., a first GUI) for display via a user interface, e.g., GUI 112. The first GUI may be generated based on the recommended navigation path and/or at least one of the predicted object, the target object, website data, historical user data, user preference data, etc. As described in more detail below, the first GUI may include one or more of a heat map, a hot spot, an indicator, etc.

Figure 3A:
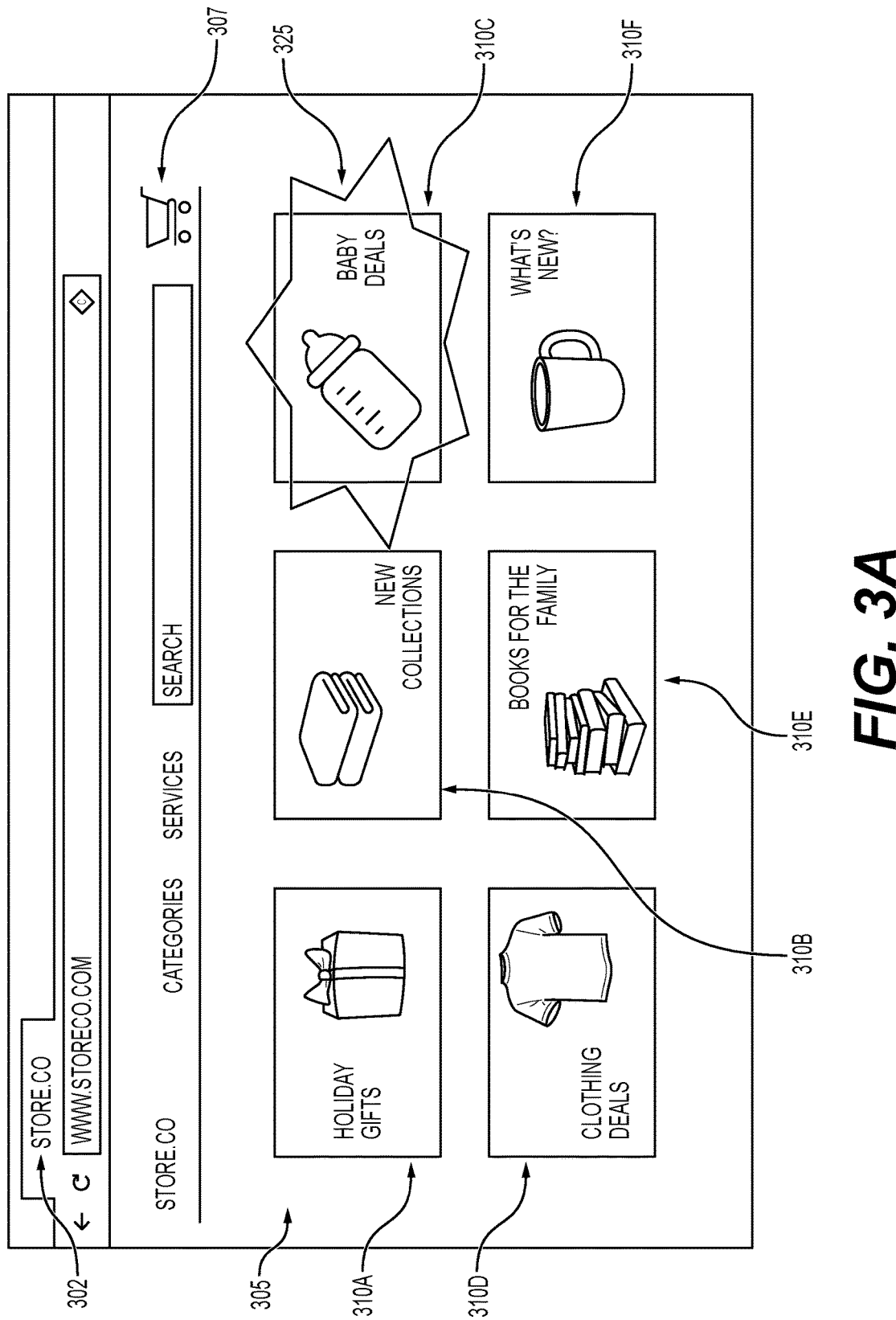
FIGS. 3A-3C depict exemplary graphical user interfaces for providing directional information, according to one or more embodiments.
Figure 3B:
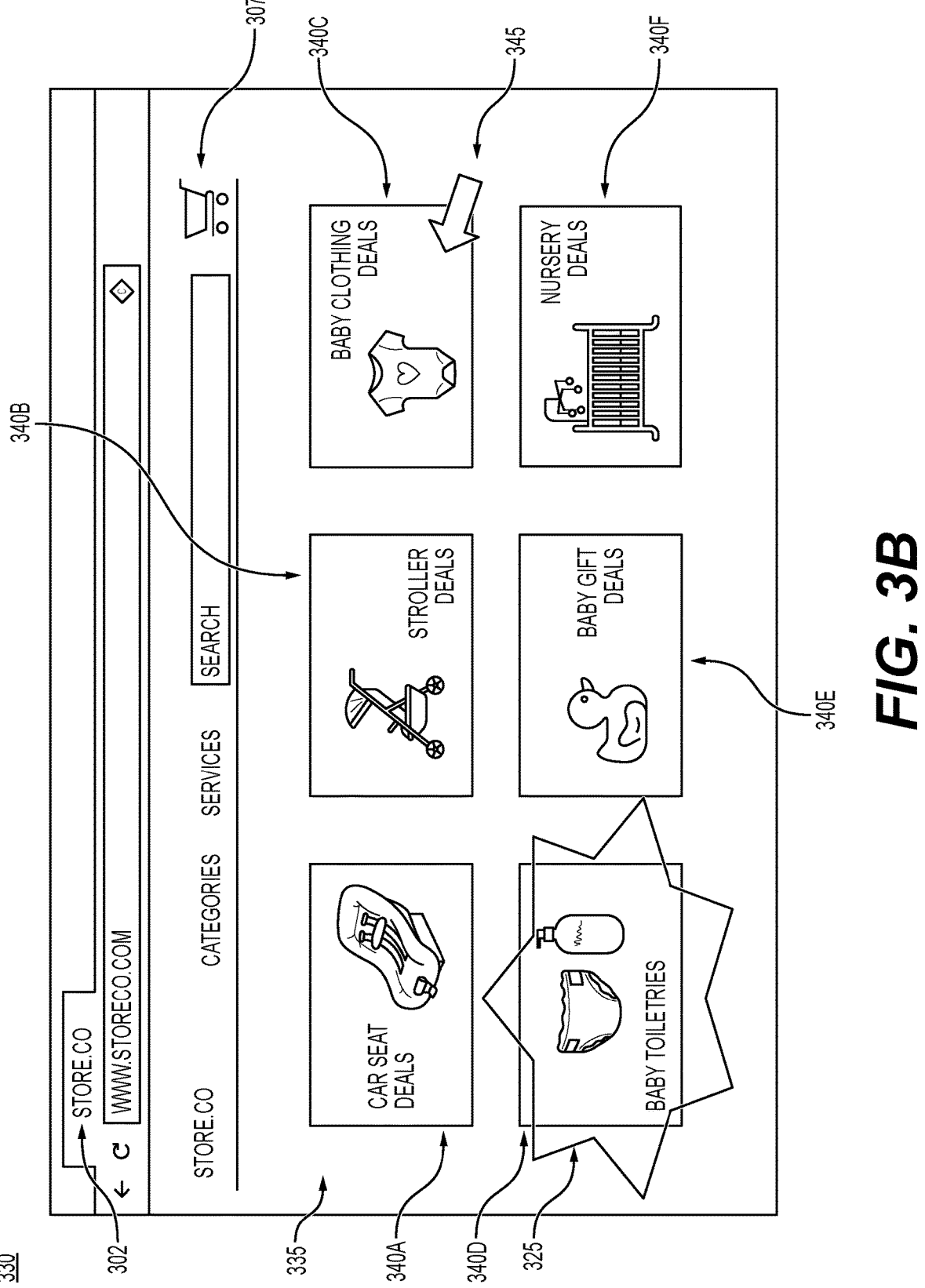
Figure 3C:
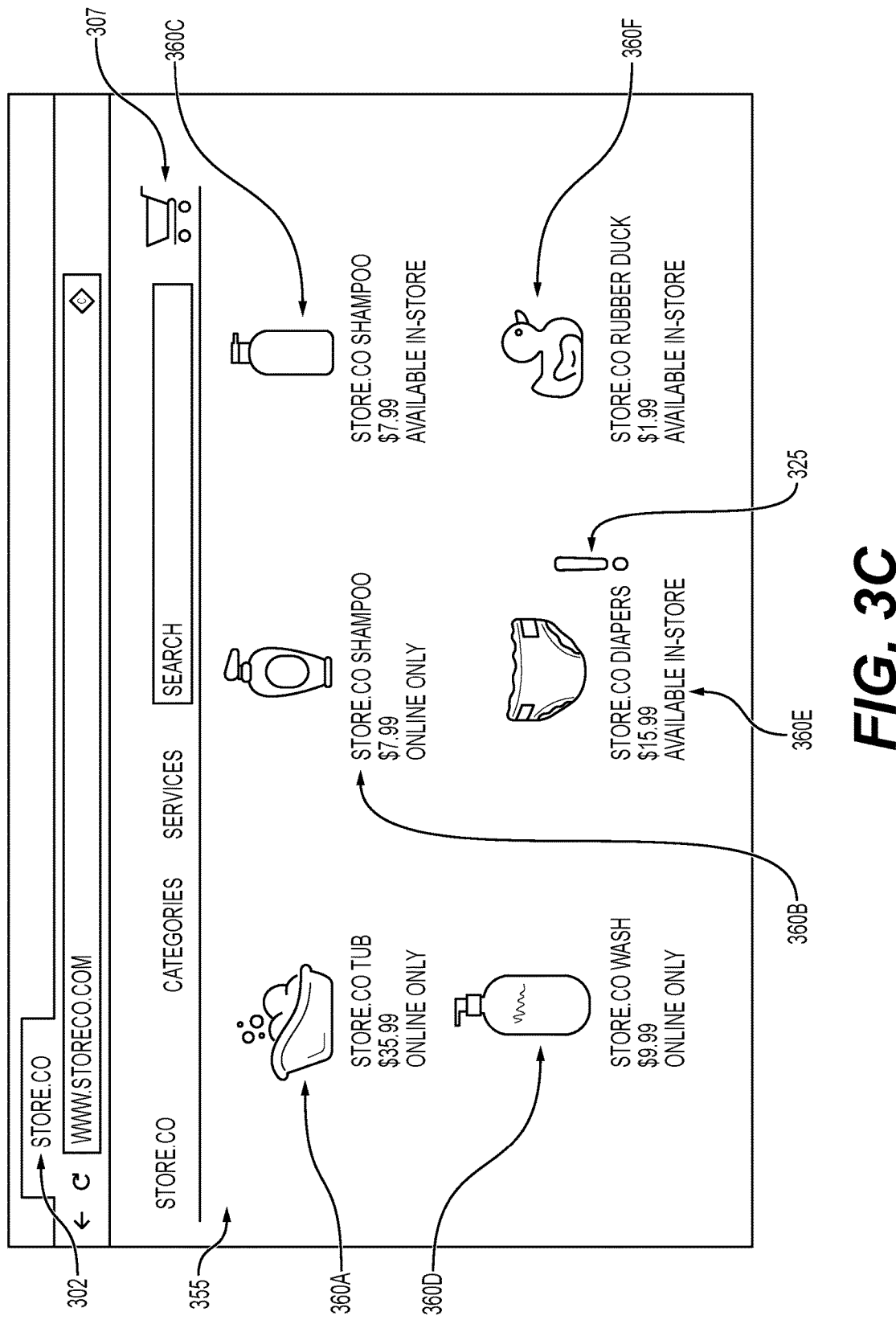

At step 212, the system hosting the directional information generation system may cause to output the first GUI, e.g., as depicted in FIGS. 3A-3C. Browser 300 of FIG. 3A may include a website 302 and a first webpage 305 (e.g., a website home page). First webpage 305 may include at least one component (hereinafter "first component"), e.g., a first component 310A, 310B, 310C, 310D, 310E, and 310F. First webpage 305 may include a shopping cart icon 307. In some embodiments, the one or more components may be hyperlinks, graphics, a search bar, a virtual cart, etc.

As depicted in FIG. 3A, a first GUI 325 may be caused to be output as a heat map overlay on first webpage 305. In this example, first GUI 325 may be generated based on a determination that the predicted object is baby diapers— given that user 105 has purchased baby diapers every week for the last 6 months and user 105 has not purchased baby diapers in over 7 days—and the target object is Store.Co Diapers (see FIG. 3C). The search query and/or first recommended navigation path may be based on the predicted object (e.g., baby diapers), the target object (e.g., Store.Co Diapers), website data for website 302 (e.g., website 302 inventory), historical user data for user 105, and/or user preference data for user 105, etc. The first recommended navigation path may be a path through website 302 that leads to Store.Co Diapers and shows related objects along the path, as discussed in further detail below.

Returning to FIG. 2, at step 214, optionally, user interaction data may be obtained based on a user interaction with the first GUI. As described in more detail above, user interaction data may be received via user 105 interacting with the first GUI, e.g., clicking, cursor hovering, etc. For example, user interaction data may include whether user 105 interacts with the first GUI and/or interacts with other aspects.

At step 216, a second GUI may be generated. The second GUI may be generated based on the user interaction data (e.g., the user interaction with the first GUI) and/or at least one of the recommended navigation path, the predicted object, the target object, website data, historical user data, user preference data, etc. The second GUI may include an alternative recommended navigation path. For example, if the first GUI is a heat map indicating a recommended navigation path and user 105 interacts with aspects other than the heat map, a second GUI may be generated to display an alternative recommended navigation path.

At step 218, the system hosting the directional information generation system may cause to output the second GUI. The second GUI may be output in addition to the first GUI, as a replacement for the first GUI, etc. For example, the second GUI may be caused to be output e.g., as depicted in FIG. 3B. Browser 330 of FIG. 3B may include a second webpage 335 (e.g., a detail page) of a website 302. Second webpage 335 may include at least one component (hereinafter "second component"), e.g., a second component 340A, 340B, 340C, 340D, 340E, and 340F. Second webpage 335 may include a shopping cart icon 307. It should be noted that while the examples described herein discuss navigating at least one webpage on a website, it is contemplated that the systems and methods described herein may be configured to navigate a webpage on and/or to multiple websites, navigate multiple webpages over multiple websites, etc.

As depicted in FIG. 3B, first GUI 325 may be caused to be output (e.g., as a heat map overlay) on second webpage 335 (e.g., to further depict the recommended navigation path), and a second GUI 345 may be caused to be output (e.g., as an indicator overlay) on second webpage 335. Second GUI 345 may be generated and caused to be output (e.g., on second webpage 335), for example, if user 105 interacts with aspects and/or at least one component of first webpage 305 other than first GUI 325. For example, second GUI 345 may reflect that user 105 interacted with first component 310D (e.g., "Clothing Deals"), such as by hovering, right clicking, etc. on first component 310D.

As depicted in FIG. 3C, first GUI 325 may be caused to be output (e.g., as an indicator overlay) on third webpage 355 (e.g., to further depict the recommended navigation path and/or to denote the target object). Browser 350 of FIG. 3C may include a third webpage 355 (e.g., a further detail page) of a website 302. Third webpage 355 may include at least one component (hereinafter "third component"), e.g., a third component 360A, 360B, 360C, 360D, 360E, and 360F. Third webpage 355 may include a shopping cart icon 307.

For example, first GUI 325 may be an indicator (e.g., an exclamation point, an arrow, a star, etc.) to denote the target object (e.g., Store.Co Diapers). In some embodiments, second GUI 345 may not be caused to be output on third webpage 355, for example, if user 105 does not interact with second GUI 345 and/or second component 340C (e.g., "Baby Clothing Deals").

In an exemplary use case of the above systems and methods, a user (e.g., user 105) may navigate to a webpage of a website (e.g., first webpage 305 of website 302). User 105 navigating to first webpage 305 may cause object system 115 and/or navigation system 125 to activate. Object system 115 may determine a predicted object for user 105 (e.g., diapers) based on factors described above. Based on the determination that the predicted object is diapers, navigation system 125 may generate at least one navigation path (e.g., a first navigation path) through website 302. Depending on the structure, layout, etc. of website 302, the first navigation path may navigate the user within a single webpage (e.g., first webpage 305) and/or a series of webpages (e.g., first webpage 305, second webpage 335, third webpage 355, etc.).

As shown in FIG. 3A, the first navigation path may cause to display first GUI 325. First GUI 325 may be a first indicator of the first navigation path that may lead user 105 to the predicted object (e.g., diapers). If user 105 chooses to follow the first navigation path by selecting the component of first webpage 305 associated with first GUI 325 (e.g., first component 310C), user 105 may be navigated to second webpage 335 (see FIG. 3B).

As shown in FIG. 3B, upon navigation to second webpage 335, the first navigation path may cause to display first GUI 325 in association with a component of second webpage 335 (e.g., second component 340D) that may lead user 105 to the predicted object (e.g., diapers). If user 105 chooses to follow the first navigation path by selecting the component of second webpage 335 associated with first GUI 325 (e.g., second component 340D), user 105 may be navigated to third webpage 355 (see FIG. 3C).

As shown in FIG. 3C, upon navigation to third webpage 355, the first navigation path may cause to display first GUI 325 in association with a component of third webpage 355 (e.g., third component 360E) that may lead user 105 to the predicted object (e.g., diapers). As shown in FIG. 3C, first GUI 325 may modify its display format. For example, if third component 360E is associated with the predicted object (e.g., diapers), first GUI 325 may use a different display (e.g., a static or animated exclamation point, star, etc.) than first GUI 325 displayed in association with other components (e.g., first component 310C, second component 340D, etc.). User 105 may continue to follow the first navigation path by selecting the component associated with first GUI 325 on third webpage 355 (e.g., third component 360E). User 105 may add the predicted object (e.g., diapers) to shopping cart icon 307.

In some embodiments, if user 105 chooses not to follow the first navigation path, such as by selecting a component not associated with first GUI 325, a second navigation path may be generated. For example, user 105 may navigate to second webpage 335 as discussed above. As shown in FIG. 3B, upon navigation to second webpage 335, the first navigation path may cause to display first GUI 325 in association with a component of second webpage 335 (e.g., second component 340D) that may lead user 105 to the predicted object (e.g., diapers). Second webpage 335 may additionally or alternatively display second GUI 345. As discussed herein, second GUI 345 may be displayed based on at least one input from user 105, such as hovering, right clicking, etc. on at least one component of first webpage 305 (e.g., at least one of first component 310A, 310B, 310D, 310E, shopping cart icon 307, etc.). If user 105 chooses to follow the second navigation path by selecting the component of second webpage 335 associated with second GUI 345 (e.g., second component 340C), user 105 may be navigated to a further webpage (not shown).

In some embodiments, the navigation path (e.g., the first navigation path, the second navigation path, etc.) may modify the GUI (e.g., first GUI 325, second GUI 345, etc.). In some embodiments, the GUI may display icon(s), shape (s), etc. that are user-specific. As discussed herein, navigation system 125 may determine which icon(s), shape(s), etc. to display via navigation machine learning model 127. For example, navigation system 125 may determine that a first user may be more responsive to animated displays, whereas a second user may be more responsive to large, static symbols. As such, the GUI (e.g., first GUI 325, second GUI 345, etc.) may be modified based on user-specific data.

Figure 4:
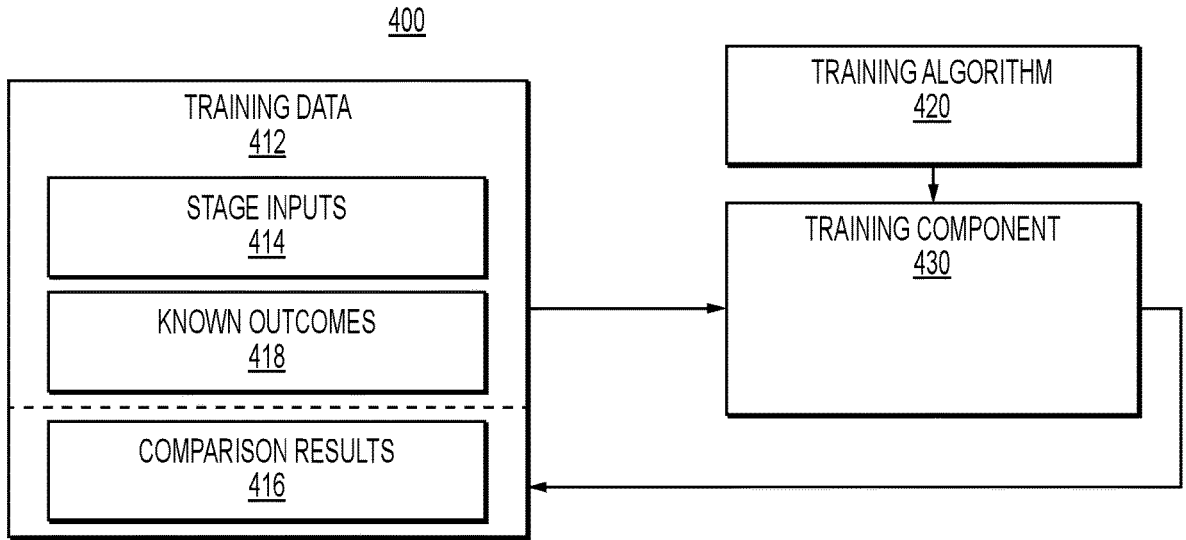
FIG. 4 depicts an example machine learning training flow chart, according to some embodiments of the disclosure.

One or more implementations disclosed herein include and/or are implemented using a machine learning model, e.g., one or more of object system 115, navigation system 125, etc., are implemented using a machine learning model and/or are used to train the machine learning model. A given machine learning model may be trained using the training flow chart 400 of FIG. 4. The training data 412 may include one or more of stage inputs 414 and the known outcomes 418 related to the machine learning model to be trained. The stage inputs 414 are from any applicable source including text, visual representations, data, values, comparisons, and stage outputs, e.g., one or more outputs from one or more steps from FIGS. 3A-3C. The known outcomes 418 are included for the machine learning models generated based on supervised or semi-supervised training. An unsupervised machine learning model is not trained using the known outcomes 418. The known outcomes 418 includes known or desired outputs for future inputs similar to or in the same category as the stage inputs 414 that do not have corresponding known outputs.

The training data 412 and a training algorithm 420, e.g., one or more of the modules implemented using the machine learning model and/or are used to train the machine learning model, is provided to a training component 430 that applies the training data 412 to the training algorithm 420 to generate the machine learning model. According to an implementation, the training component 430 is provided comparison results 416 that compare a previous output of the corresponding machine learning model to apply the previous result to re-train the machine learning model. The comparison results 416 are used by the training component 430 to update the corresponding machine learning model. The training algorithm 420 utilizes machine learning networks and/or models including, but not limited to a deep learning network such as a transformer, Deep Neural Networks (DNN), Convolutional Neural Networks (CNN), Fully Convolutional Networks (FCN) and Recurrent Neural Networks (RCN), probabilistic models such as Bayesian Networks and Graphical Models, classifiers such as K-Nearest Neighbors, and/or discriminative models such as Decision Forests and maximum margin methods, the model specifically discussed herein, or the like.

The machine learning model used herein is trained and/or used by adjusting one or more weights and/or one or more layers of the machine learning model. For example, during training, a given weight is adjusted (e.g., increased, decreased, removed) based on training data or input data.

Similarly, a layer is updated, added, or removed based on training data/and or input data. The resulting outputs are adjusted based on the adjusted weights and/or layers.

Figure 5:
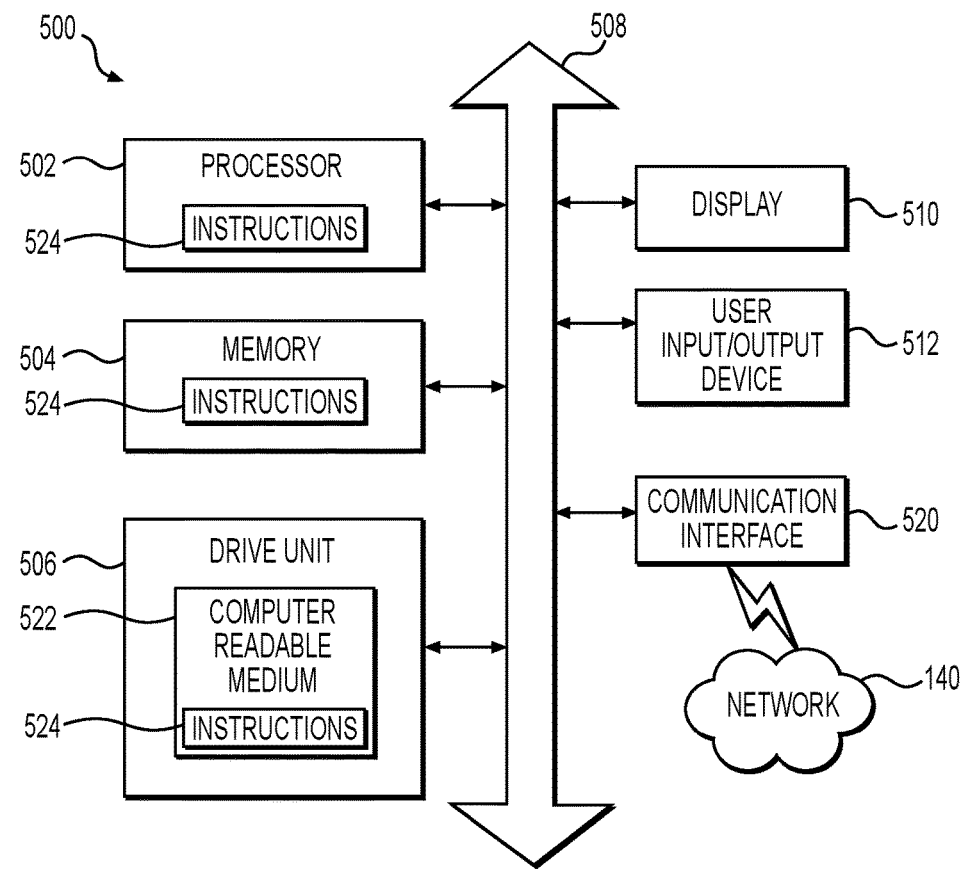
FIG. 5 depicts a simplified functional block diagram of a computer, according to one or more embodiments.

FIG. 5 depicts a simplified functional block diagram of a computer 500 that may be configured as a device for executing the methods disclosed here, according to exemplary embodiments of the present disclosure. For example, the computer 500 may be configured as a system according to exemplary embodiments of this disclosure. In various embodiments, any of the systems herein may be a computer 500 including, for example, a data communication interface 520 for packet data communication. The computer 500 also may include a central processing unit (CPU) 502, in the form of one or more processors, for executing program instructions. The computer 500 may include an internal communication bus 508, and a storage unit 506 (such as ROM, HDD, SDD, etc.) that may store data on a computer readable medium 522, although the computer 500 may receive programming and data via network communications. The computer 500 may also have a memory 504 (such as RAM) storing instructions 524 for executing techniques presented herein, although the instructions 524 may be stored temporarily or permanently within other modules of computer 500 (e.g., processor 502 and/or computer readable medium 522). The computer 500 also may include input and output ports 512 and/or a display 510 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A method for generating directional information, the method comprising:
   detecting an occurrence of a first trigger event by monitoring inputs from a user;
   upon detecting the occurrence of the first trigger event, generating, via one or more processors, a first search query based on a predicted object, wherein the predicted object is determined, via a first trained machine learning model, based on one or more of website data, historical user data, or user preference data;
      determining, via a second trained machine learning model, a target object based on the first search query;
      determining, via the second trained machine learning model, a recommended navigation path to the target object based on at least one of website data, historical user data, or user preference data;
   generating a first graphical user interface (GUI) based on the recommended navigation path, the first GUI including an overlay over a first aspect of a website; and
   causing to output, via a user interface, the first GUI.

2. The method of claim 1, wherein the first trigger event includes one or more of opening the website, selecting a link on the website, or entering a search on the website.

3. The method of claim 1, wherein upon detecting an occurrence of a first trigger event, the method further comprises:

obtaining, via the user interface, a request for the predicted object, the request associated with a user.

4. The method of claim 1, wherein the second trained machine learning model has been trained to learn associations between training data to identify an output, the training data including a plurality of: website data, historical user data, and user preference data.

5. The method of claim 1, wherein the website data includes at least one of user browsing history, site-specific data, or site-specific metadata.

6. The method of claim 1, wherein the historical user data includes at least one of prior searches associated with the website, previously viewed object reviews, or purchase history data.

7. The method of claim 1, wherein the user preference data includes at least one of user shopping preference data, user brand preference data, and object composition preference data.

8. The method of claim 1, further comprising:

obtaining user interaction data based on a user interaction with the first GUI;

generating a second GUI based on the user interaction with the first GUI; and causing to display the second GUI via the user interface such that the second GUI is an overlay over a second aspect of the website.

9. The method of claim 1, wherein the determining the recommended navigation path includes:

determining one or more navigation paths to direct a user to the target object based on at least one of website data, historical user data, or user preference data; and determining, via the second trained machine learning model, the recommended navigation path based on the one or more navigation paths.

10. A system, the system comprising:

at least one memory storing instructions; and at least one processor operatively connected to the at least one memory, and configured to execute the instructions to perform operations for generating directional information, the operations including:

detecting an occurrence of a first trigger event by monitoring inputs from a user;

upon detecting the occurrence of the first trigger event, generating, via one or more processors, a first search query based on a predicted object, wherein the predicted object is determined, via a first trained machine learning model, based on one or more of website data, historical user data, or user preference data;

determining, via a second trained machine learning model, a target object based on the first search query;

determining, via the second trained machine learning model, a recommended navigation path to the target object based on at least one of website data, historical user data, or user preference data;

generating a first graphical user interface (GUI) based on the recommended navigation path, the first GUI including an overlay over a first aspect of a website; and causing to output, via a user interface, the first GUI.

11. The system of claim 10, wherein the first trigger event includes one or more of opening the website, selecting a link on the website, or entering a search on the website.

12. The system of claim 10, wherein upon detecting an occurrence of a first trigger event, the operations further include:

obtaining, via the user interface, a request for the predicted object, the request associated with a user.

13. The system of claim 10, wherein the second trained machine learning model has been trained to learn associations between training data to identify an output, the training data including a plurality of: website data, historical user data, and user preference data.

14. The system of claim 10, wherein the website data includes at least one of user browsing history, site-specific data, or site-specific metadata.

15. The system of claim 10, wherein the historical user data includes at least one of prior searches associated with the website, previously viewed object reviews, or purchase history data.

16. The system of claim 10, further comprising:

obtaining user interaction data based on a user interaction with the first GUI;

generating a second GUI based on the user interaction with the first GUI; and causing to display the second GUI via the user interface such that the second GUI is an overlay over a second aspect of the website.

17. The system of claim 10, wherein the determining the recommended navigation path includes:

determining one or more navigation paths to direct a user to the target object based on at least one of website data, historical user data, or user preference data; and determining, via the second trained machine learning model, the recommended navigation path based on the one or more navigation paths.

18. A method for generating directional information, the method comprising:

detecting an occurrence of a first trigger event by monitoring inputs from a user, the first trigger event including one or more of opening a website, selecting a link on the website, or entering a search on the website;

upon detecting the occurrence of the first trigger event, generating, via one or more processors, a first search query based on a predicted object, wherein the predicted object is determined via a trained object prediction machine learning model, the predicted object based on at least one of website data, historical user data, or user preference data;

determining, via a trained target object machine learning model, a target object based on the first search query;

determining, via the trained target object machine learning model, a recommended navigation path to the target object based on at least one of website data, historical user data, or user preference data;

generating a first GUI based on the recommended navigation path, the first GUI including an overlay over a first aspect of the website; and causing to output, via a user interface, the first GUI.

* * * * *